April 7, 1931.   G. MORGAN   1,799,524

LIP STICK MOLD

Filed Aug. 15, 1928

Witness
D E Bovey

Inventor
Comar Morgan
by Bair, Freeman & Sinclair
Attorneys

Patented Apr. 7, 1931

1,799,524

UNITED STATES PATENT OFFICE

GOMAR MORGAN, OF DES MOINES, IOWA, ASSIGNOR TO THE ARMAND COMPANY, OF DES MOINES, IOWA

LIP-STICK MOLD

Application filed August 15, 1928. Serial No. 299,684.

The object of my invention is to provide a lip stick mold of very simple, durable and inexpensive construction.

More particularly, it is my object to provide a lip stick mold in which the lip stick may be molded complete with the cap on the end.

In this connection, one special purpose of my present device is to provide a mold made of a plurality of members adapted to be suitably connected together to serve its function and so constructed as to properly support at the upper end of the recess in the mold a tubular cap which then forms part of the mold, and which when the lip stick is poured will contain one end of such stick, so that when the lip stick is taken from the mold it is ready for use.

Still another object is to provide a mold, in which the respective halves are made of parts so constructed and connected together as to properly provide for the making of the lip stick point and to reduce the cost and number of operations in the making of the mold.

With these and other objects in view, my invention consists in the construction, arrangement and combination of the various parts of my lip stick mold, whereby the objects contemplated are attained, as hereinafter more fully set forth, pointed out in my claims, and illustrated in the accompanying drawings, in which:

Heretofore in molding lip sticks, it has been the practice to provide a mold, such that special operations were required for making the beveled point or end of the lip stick. These operations are eliminated where a mold of the kind herein described is employed.

Figure 1:
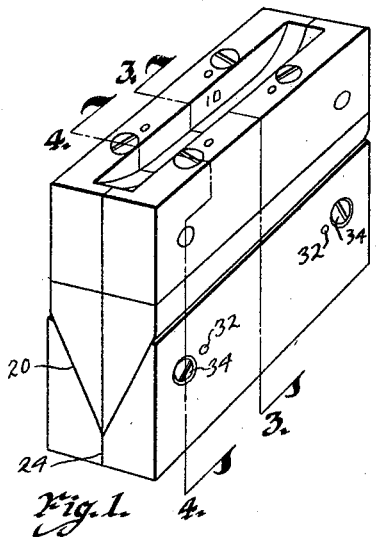
Figure 1 is a perspective view of a lip stick mold embodying my invention.
Figure 2:
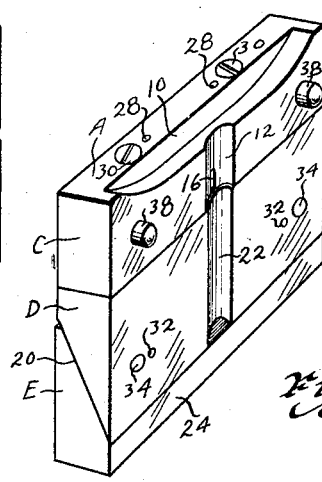
Figure 2 is a perspective view of the mold with the respective halves moved apart to show their adjacent faces.
Figure 2:
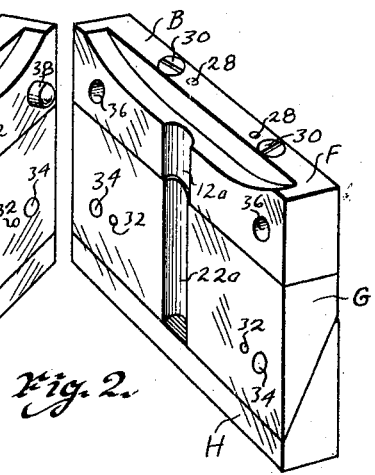
Figure 3:
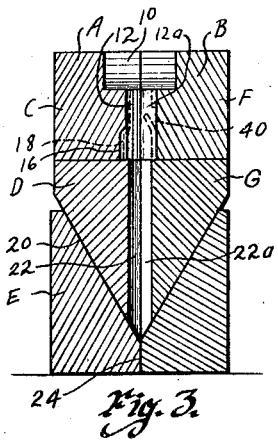
Figure 3 is a vertical, transverse, sectional view taken on the line 3—3 of Figure 1.
Figure 4:
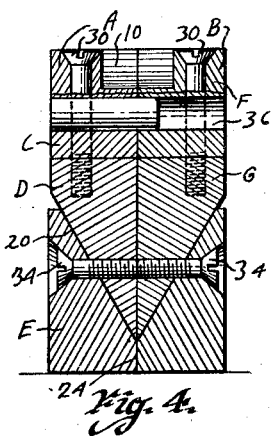
Figure 4 is a detail, sectional view taken on the line 4—4 of Figure 1.

My lip stick mold is made in two halves, which are respectively indicated at A and B in Figure 2.

In the form of the mold herein shown, each half is made of three pieces suitably connected together.

I will first describe the half A. This comprises the three parts indicated generally at C, D and E. The upper part has generally the shape of a block, rectangular in cross section and substantially longer than it is wide or high. The block C has in its upper face adjacent to its inner side an elongated rabbet indicated by the reference numeral 10. Extending downwardly from the central part of the rabbet 10 at the inner face of the block A is a groove 12 semi-elliptical in horizontal cross section or of any suitable shape for the particular lip stick to be molded.

Figure 6:
Figure 6 is a perspective view of the cap used with my mold and forming part of the mold during the molding operation and part of the lip stick when the stick is completed.

The groove 12 is intended to receive the cap 14 shown in Figure 6 and which will be hereinafter again referred to. The groove 12 extends from the rabbet 10 to the lower edge of the block C. At the lower central part of the groove 12 is a deepened vertical recess 16 to receive the rib 18 on the cap 14.

Below the block C is the block D, the inner face of which registers with the inner face of the block C as shown. The block D is preferably of the same length as the block C and is substantially wider from top to bottom as shown in Figure 2.

The outer face of the block D for the lower portion of its height is beveled as at 20. The inner face of the block D is provided with a vertical groove 22, which registers with the groove 12 and is of semi-elliptical form with a long axis slightly less than that of the groove 12, so as to leave a shoulder at the upper end of the groove 22 upon which the cap 14 may rest.

The lower block E has an inner face, which registers in alignment with the inner face of the block D. This lower inner face of the block E is indicated at 24. Above the face 24, the inner face of the block E is beveled as at 26 to correspond with the beveled face 20.

The blocks C and D are connected together by centering pins 28 and by suitable screws 30, arranged vertically as shown.

The blocks D and E are secured together by suitable centering pins 32 and by screws 34.

Referring now to the mold half B, it will be noted that it consists of the three blocks F, G and H, similar in general construction and arrangement to the blocks C, D and E of the mold half A.

The block F has at its upper part in its inner face the rabbet 10a similar to the rabbet 10. At the lower, central part of the rabbet 10a is formed the downwardly extending groove 12a, similar to the groove 12, except that the groove 12a does not have the recess 16 or any corresponding recess.

The block G is similar in structure to the block D and has the groove 22a corresponding in construction and location and arrangement to the groove 22 in the block D.

The block H is similar in structure to the block E.

The block F of the mold half B has in its inner face suitable holes 36 spaced on opposite sides of the groove 12a adapted to receive the centering pins 38 projecting from the inner face of the block C.

Figure 5:
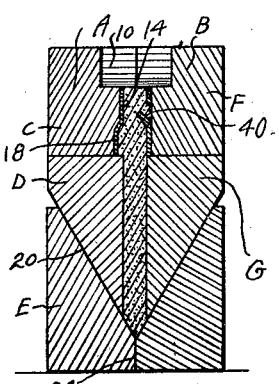
Figure 5 is a detail, sectional view similar to that of Figure 2, showing the lip stick in the mold with the cap thereon.

The cap 14 hereinbefore referred to is in the form of a tube open at both ends, as illustrated for instance in Figure 5, and has in its side opposite the one having the rib 18 the inward projection or tongue 40, the purpose of which is to project into the lip stick for holding the cap on the lip stick.

In the actual use of the mold herein described, the cap 14 is placed in the groove 12 with the rib 18 received in the recess 16. Then the two mold halves are placed together, whereupon the cap 14 will be received in the grooves 12 and 12a and will rest on the shoulders formed at the upper ends of the grooves 22 and 22a, which are of such size that when the material for making the lip stick is poured into the upper part of the mold, the lip stick will be of substantially the same diameter throughout.

The material is placed in the recess formed by the rabbets 10 and 10a and is enclosed or is forced downwardly into the mold grooves 10, 10a, 22 and 22a.

It is the custom to make the end of the lip stick beveled to an edge, as illustrated for instance in Figure 5.

A mold of this kind accomplishes that purpose and eliminates the necessity for giving this shape to the end of the lip stick after the molding operation has been completed.

It will be seen that on account of the use of the beveled faces 20 and 26 of the blocks D and E and the beveled faces of the blocks G and H, the lower part of the mold is formed in such a way as to give the lip stick the structure.

The inside of the rib 18 forms a groove or channel which receives the lip stick and thus serves to fasten the lip stick to the cap 14. Thus the lip stick is molded by passing it through the cap 14 until the mold is filled, whereupon the lip stick will be completed with its beveled end formed and with its other end received in the cap 14, and the lip stick will be entirely completed.

This results in the reduction of expense over that involved where molds are used, which make it necessary to perform the beveling operation after the molding operation has been completed.

The making of the mold halves in three parts as herein explained makes it possible to conveniently secure the beveled end of the lip stick and also makes it convenient for supporting the cap 14 in position, so that the material for making the lip stick can be fed through it into the lower part of the mold.

I claim as my invention:

A mold for lip sticks or the like, comprising mold members, each having three blocks successively connected together, the respective blocks having their inner faces in the same plane, the upper block having a downwardly projecting groove extending therefrom to the lower edge of the upper block, the central block having an aligned groove slightly smaller than said first groove whereby to form a supporting shoulder, the central block having a beveled outer face and the lower block having a beveled inner face, which fit together, so that the latter face forms the lower part of the mold for providing a product with a beveled end, means for securing the blocks of each half together, and means for centering the respective halves whereby when the halves are placed together a mold cavity is formed for receiving a tubular cap at the upper part of such cavity and resting on said shoulder for permitting material to be fed through the cap into the lower part of the mold cavity.

Des Moines, Iowa, May 8, 1928.

GOMAR MORGAN.